Figure 1:
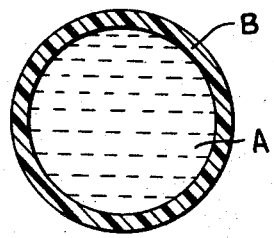

United States Patent Office 3,429,827
Patented Feb. 25, 1969

3,429,827
METHOD OF ENCAPSULATION
Henn Ruus, Niagara Falls, N.Y., assignor to Moore Business Forms, Inc., Niagara, Falls, N.Y., a corporation of Delaware
Filed Nov. 23, 1962, Ser. No. 239,732
U.S. Cl. 252—316
Int. Cl. B01j 13/02
7 Claims This invention relates to a process of encapsulation and to novel encapsulated substances. More particularly, the invention embraces an encapsulated substance having a shell of insoluble, infusible, high molecular weight condensation polymer. The encapsulating process comprises division and dispersion of the substance to be encapsulated as a discontinuous phase, within a continuous fluid phase. Each phase must contain an intermediate or an intermediate must be added, which will react with the intermediate in the other phase to form a continuous high molecular weight condensation polymer film at the interface of the two phases. The dispersed substance is enclosed within the polymer film.

The art of encapsulation has been the object of considerable attention in recent years in view of the increased need to maintain a reactive material in an inert stage until such time as it is called upon to perform a given function. Thus, inertness is provided by interposing, by encapsulation, a non-reactive barrier or shell between the reactive material and its immediate surrounding. Removal of the barrier or shell by any suitable means "activates" the encapsulated substance. In this manner, the handling properties of solids can be conferred on liquids and gases. Adhesives can be made non-adhesive until adherence is required and reactive chemicals can be maintained inactive until such time as their reactivity is released. Flammable substances can be rendered non-flammable while being transported or during storage, but readily released unchanged when desired.

More specifically, the technique of encapsulation is employed effectively in the manufacture of manifold paper where a thin layer of microscopic capsules containing a suitable marking substance are bonded to a pliable sheet. The marking substance is maintained inactive until the capsules are ruptured by pressure of a stylus or other means. Encapsulated substances are useful in the preparation of drugs where a delayed effect is desired. Thus, the active ingredient can be coated with a suitable protective layer and when the drug is taken internally, it will not immediately affect the patient but remains inactive until the polymer layer is dissolved. As is apparent, depending on the encapsulating substance, the influence of the drug can be delayed from a matter of minutes up to several hours. The encapsulation technique can also be used in the preparation of pressure sensitive adhesives for application to placards, envelopes, etc. where it is necessary that the surface remain non-adhesive until adherence is desired. By employing encapsulating substances, it is not necessary to wet the surface but adherency is obtained by merely applying pressure.

Several methods are presently known for micro-encapsulation. Thus, Green U.S. Patent No. 2,712,507 describes the encapsulation of a hydrophilic oil by gelatin and gelatin-gum arabic complexes utilizing a "coacervation" process. The process is limited to water-soluble hydrophilic colloids and cannot be used for encapsulation of water or water-soluble substances. Moreover, materials which are sensitive to the acid pH of the process are inoperable. Brynko U.S. Patent No. 2,969,330 discloses encapsulation by an addition polymerization process whereby at least one selected monomer is dissolved in an oil in which the solid polymer material is insoluble. The solution is then dispersed as droplets in a polar liquid where polymerization occurs due to the influence of a catalyst which can be introduced in any of the phases. The polymer material deposits at the interface of the oil droplets and polar liquids forming an individual solid wall around each oil droplet resulting in discrete, pressure rupturable, substantially spherical, oil-containing capsules. However, again the process described excludes encapsulation of water-soluble materials. Macaulay U.S. Patent No. 3,016,308 enumerates a wide range of substances encapsulated by a variety of film formers. The suspension-evaporation method described can be used for encapsulation with polymers which are soluble in suitable solvents. For high molecular weight polymers, however, available solvents are very limited and solution viscosities high, substantially limiting the process as a practical matter.

Accordingly, it is an object of the instant invention to provide a simplified method of encapsulation wherein the capsule shell consists of a high molecular weight condensation polymer.

It is another object of the instant invention to provide a simplified method of encapsulating water or water-soluble substances.

It is another object of this invention to provide an encapsulated product having an insoluble and infusible polymer shell.

It is another object of the instant invention to provide an encapsulated product wherein the product is water or an aqueous solution or dispersion.

It is another object of this invention to provide an encapsulated product having high uniformity of thickness of the polymeric capsule shell.

It is another object of the instant invention to provide a dry, free-flowing, discrete microscopic capsule.

It is another object of the instant invention to provide an improved manifold paper having microscopic, pressure rupturable capsules on at least one surface thereof, wherein the capsule shell consists of a high molecular weight condensation polymer such as a polyamide, polyester, polyurethane, polysulfonamides, etc.

These and other objects of the instant invention will become more fully apparent from the following detailed description with particular emphasis being placed on the examples and annexed drawing.

In general, the objects of the present invention are accomplished by utilizing a modification of the known interfacial polycondensation technique. Such techniques are thoroughly described in the literature, with the article entitled "Interfacial Polycondensation, a Versatile Method of Polymer Preparation," by P. W. Morgan, Society Plastics Engineers Journal, 15, 485–495 (1959) providing a good summary of the reactions involved and the polymers which can be prepared by this method. Magat et al. U.S. Patent No. 2,708,617 also describes the technique. Essentially, the process comprises bringing two reactants together at a reaction interface where polycondensation occurs substantially instantaneously to form a thin film which is insoluble in the parent media of the reactants. The interface can be temporary or permanent. If the reactants are dissolved separately in two mutually soluble media and one medium dispersed within the other, the rate of the condensation may be of such speed that the insoluble film is formed before substantial solution of one medium in the other occurs, the thin polymer film formed, thereafter, preventing further mutual solution of the media.

The preferred and mechanically most simple method of providing the interface for encapsulation is to disperse or emulsify one reactant for the condensation polymer in a continuous phase containing the second reactant. The substance to be encapsulated will also be contained in the dispersed phase. However, in order to more accurately control the formation of the capsules, it can be convenient to emulsify or disperse one reactant for the condensation polymer, together with the substance to be encapsulated in a continuous phase and thereafter add additional continuous phase containing the second reactant to the dispersion. The polycondensation polymer shell will form at the interface of the dispersed substance and encapsulate the material. The dispersion or emulsion can be stabilized by addition of surface active agents, or protective colloids to the continuous phase.

The dispersion or emulsion can be produced by the standard suspension and emulsification techniques known in the art. Thus, emulsions or dispersions can be prepared by agitation, preferably in the presence of one or more emulsifying agents. The efficiency of the emulsification depends among other factors, on the type and degree of agitation and the manner in which the emulsifying agent is introduced. The primary function of the agitation is to break up both phases of the emulsion so that the one which will become the dispersed phase is able to form small globules. The emulsifier is employed to lower the interfacial tension since the lower the interfacial tension the lower the amount of mechanical energy needed to break up the phases. Where the interfacial tension of a system is extremely low, spontaneous emulsification may result. The preparation of the emulsions can be facilitated by various types of colloid mills and homogenizers engineered to obtain maximum shear action of the fluid and enhance the formation of fine uniform globules.

Emulsifying agents which are operable in preparing the emulsions or dispersions include the long chain polar and non-polar compounds, as well as the more complex hydrophilic colloids, such as gums, starches, proteins, etc. which are known to be readily adsorbed at the phase interfaces.

In addition to simple agitation with or without emulsifier, the dispersion can be formed by injecting one phase into a second phase from an orifice at a rate designed to exceed the critical velocity required for continuous flow. A solid phase containing one reactant may be dispersed into a continuous medium containing the second reactant. The continuous medium may contain the second reactant or a solution of the second reactant also as a discontinuous phase. Such would be the case when a liquid or solid medium containing the first reactant is dispersed into a continuous gaseous phase containing a fine dispersion of the second reactant. The effective reactive area of the second reactant can be increased by reducing the particle size of its dispersion.

Capsules having a wide variety of structures can be prepared by the process of the instant invention. Thus, FIGURES 1–4 of the drawing are representative of the final structures possible but are not to be construed as being limiting. In the drawing, FIGURE 1 illustrates a capsule wherein A is the encapsulated material and B is a shell of high molecular weight polymer, produced by interfacial polycondensation.

Figure 2:
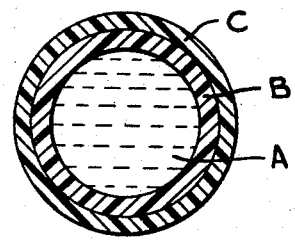

FIGURE 2 depicts a capsule wherein A is the encapsulated material, B is the shell composed of a high molecular weight polymer produced by interfacial polycondensation and C is a second shell which is applied by a spray drying process, or similar technique or coating a dry particulate substance.

Figure 3:
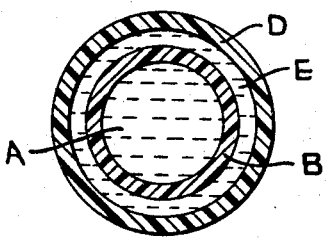

In FIGURE 3, A is the encapsulated material, B is a polymer shell formed by interfacial polycondensation and E represents a second phase which may be similar to or different from A. D represents a second condensation polymer shell, which may be the same as or different from B.

Figure 4:
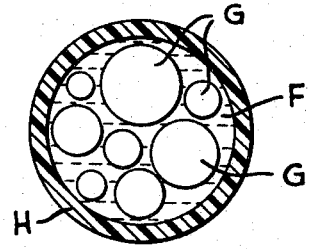

In FIGURE 4, G represents the capsules of FIGURES 1, 2 or 3, F is a dispersion medium for capsules G, and H represents an interfacial polymer shell.

Virtually any material can be encapsulated by the instant process, provided reasonable precautions are exercised to avoid selecting materials which tend to interfere with the interfacial polycondensation reaction. However, by judicious selection of the reactants to take part in the polycondensation, bearing in mind the nature of the material to be encapsulated, no problem will be encountered. Thus, the substances to be encapsulated can be gases, liquids or solids which are water-insoluble or water-soluble. As noted hereinbefore, in the prior art methods, it has not been possible to encapsulate water or water-soluble substances. However, in accordance with the instant invention, water and water-soluble substances can be encapsulated by at least two methods. Thus, a solution of water and a reactant can be extruded into a solution of the second reactant for the condensation polymer, forming small droplets of water within the solution and instantaneously encasing the droplets by the formation of condensation polymer at the interface. The second method comprises forming a water-in-oil emulsion or dispersion and thereafter adding a solution of the second reactant. The reaction of the two reactants at the interface will encase the water or water-soluble substance within a polymer shell.

As is apparent, water-insoluble materials can be encapsulated by the reverse of the technique described hereinbefore. According to the instant invention, volatile liquids such as toluene, xylene, methyl ethyl ketone can be encapsulated in polyamide polymer shell, as well as non-volatile liquids such as methyl phthalyl ethyl glycolate. Additionally, reactive substances such as acids, alkaline materials, activated monomers, i.e., monomers in the presence of a catalyst, can be encapsulated in a polycondensation shell of a high molecular weight polyamide or polyurethane. Polyesters can be employed to encapsulate volatile liquids such as toluene or xylene, as well as flammable liquids.

Depending upon the ultimate use of the encapsulated materials, it may be desirable to have more than one layer of "active" substance coated with one or more polymer layers. Systems of this type have been described and illustrated in FIGURE 3 of the drawing.

Thus, in the preparation of drugs, it can be desirable to encapsulate an "active" substance and thereafter, enclose a thin layer of a second substance around the first capsule, which may be less "active" or have a counteracting effect for the initial encapsulated substance. As is apparent, if the instant process is employed to encapsulate drugs, the polymer and carriers selected must necessarily be non-toxic.

Additionally, it may be desirable to re-coat the original encapsulated substances with a heavier coating, employing methods commonly known in the art. One such method would be to suspend the discrete microcapsules in a column of air and spray a liquid encapsulating substance onto the particles. The particles, being suspended in air and in constant motion, will not unduly agglomerate and will be evenly coated with the encapsulating substance. Another method is to spray the discrete capsules with a suitable adhesive material and thereafter coat the microcapsules with a finely divided powder by means of a moving fluid bed. Suitable methods and apparatus are disclosed in U.S. Patent Nos. 2,986,475, 2,768,095 and 2,799,241. The substances employed to re-coat the microcapsules include commonly known encapsulating materials such as cellulose and synthetic polymers, including polyethylene, polypropylene, polymethylmethacrylate, polymethacrylate, etc.

As is apparent, substances such as inks, dyes, paints, adhesives, activated monomers, drug preparations, etc. can be encapsulated according to the instant invention. It is only necessary to apply reasonable care in order that the substances to be encapsulated do not interfere with the interfacial polycondensation of the particular reactants. By judicious selection, substantially any substance can be encapsulated. Thus, a substance to be encapsulated which will influence the interfacial polycondensation reaction of one pair of reactants is not likely to influence the polycondensation reaction of a second pair of reactants having substantially opposed characteristics. As will be more fully apparent from the examples, polymer shells can be formed which are polyamides, polyurethanes, polysulfonamides, polyesters, polyureas, etc.

The following examples will serve to further illustrate the invention. However, it should be understood that the invention is not intended to be limited thereby. In the examples, proportions expressed are parts by weight unless otherwise indicated.

EXAMPLE 1

A volatile non-polar liquid encapsulated in a polyamide shell was prepared as follows: 4 parts polyvinyl alcohol and 0.1 part tetrasodium pyrophosphate were dissolved in 250 parts water. Thereafter, 25 parts terephthaloyl chloride in 67 parts toluene were emulsified in the aqueous medium, employing rapid agitation at a temperature of ca. 25° C.

A solution of 8 parts ethylenediamine, 0.5 part 1,6-hexanediamine, 10 parts sodium hydroxide and 75 parts water was made up and slowly added to the emulsion of terephthaloyl chloride and toluene with rapid agitation while maintaining the temperature at approximately 25° C. Substantially immediately upon addition of the amine solution, microscopic capsules were formed. When all the diamine solution had been added, the capsules were filtered and examined microscopically. Under pressure of a stylus, the capsule shells were ruptured to release the enclosed toluene.

EXAMPLE 2

A non-volatile liquid was encapsulated in a polyamide shell as follows: A solution of 10 parts of toluene, 87 parts methyl phthalyl ethyl glycolate and 25 parts of terephthaloyl chloride was emulsified into 250 parts water containing 0.1 part tetrasodium pyrophosphate and 4 parts polyvinyl alcohol with rapid agitation at approximately room temperature. To the above solution was slowly added a solution of 8 parts ethylenediamine, 0.5 part 1,6-hexanediamine and 10 parts sodium hydroxide in 75 grams water. Substantially immediately upon addition of the amine solution capsules were formed at the interface of the dispersed materials. The resultant capsules, upon crushing, exuded the enclosed methyl phthalyl ethyl glycolate.

EXAMPLE 3

A reactive constituent in a non-volatile liquid phase can be encapsulated in a polyamide shell as follows: 2 parts dichlorobenzoic acid, 25 parts terephthaloyl chloride, 10 parts toluene and 87 parts methyl phthalyl ethyl glycolate were emulsified into 250 parts water containing 4 parts polyvinyl alcohol and 0.1 part tetrasodium pyrophosphate by rapid agitation, maintaining the temperature at approximately 25° C. To the emulsion a solution of 16 parts ethylenediamine and 1 part 1,6-hexanediamine in 75 parts water was slowly added. Substantially immediately upon addition of the diamine solution, polymer formation occurred at the interface of the dispersed phase of the emulsion, forming microscopic capsules. On applying pressure to the microscopic capsules obtained, the oily fluid containing the dissolved dichlorobenzoic acid was exuded.

EXAMPLE 4

A non-volatile liquid was encapsulated in a polyester shell as follows: A solution of 15.5 parts terephthaloyl chloride in 10 parts toluene and 87 parts methylphthalyl ethyl glycolate was emulsified into 200 parts water containing 4 parts polyvinyl alcohol and 0.1 part tetrasodium pyrophosphate, employing rapid agitation while maintaining the temperature at approximately 25° C. To this emulsion was slowly added a solution of 17.5 parts 2,2-bis(4-hydroxyphenyl)propane and 6.2 parts sodium hydroxide in 100 parts water. Substantially immediately upon addition of the dissolved phenol polymerization occurred at the interface of the dispersed phase of the emulsion forming capsules which contained the methyl phthalyl ethyl glycolate as the liquid phase.

EXAMPLE 5

A continuous bond sheet having a film of microscopic capsules containing an inflammable liquid on one surface was prepared as follows: 5 parts terephthaloyl chloride and 150 parts petroleum solvent having a boiling point of 194–205° F., a flash point of 25° F., and a specific gravity of 0.741 at 60° F. and 95% of which distilled in the temperature range of 235–247° F, was emulsified in 350 grams of a 2% aqueous gum-arabic solution utilizing high speed agitation in a Waring Blendor and ambient temperature. The emulsion was immediately added to a solution of 10 parts diethylenetriamine in 150 parts of water and the mixture stirred vigorously by hand. A film of microcapsules having a wet thickness of 0.003 inch was drawn down on a continuous bond sheet and oven dried at 95° C. On applying pressure to the surface of the coating to rupture the shell of the microcapsule, copious amounts of the enclosed liquid were exuded. In order to determine the nature of the encapsulated liquid, a flint spark was applied to the unruptured coating and no ignition took place. After rupture of the coating, however, and exudation of the liquid, immediate ignition took place on sparking indicating that the liquid was the flammable petroleum solvent. The film of microcapsules was oven heated at 95° C. for 48 hours and re-tested. No apparent change occurred in the nature or amount of encapsulated liquid.

EXAMPLE 6

An activated monomer encapsulated in a polyamide shell was prepared as follows: 3.75 parts terephthaloyl chloride, 0.5 part azodiisobutyronitrile and 100 parts methyl methacrylate were emulsified in 180 parts water containing 4.5 parts polyvinyl alcohol by rapid agitation at approximately 25° C. The emulsion was thereafter poured into a solution of 1.25 parts diethylene triamine and 1.5 parts sodium hydroxide in 180 parts water and the mixture was allowed to stand for several minutes. The microcapsules formed were examined microscopically and under applied pressure the capsules were observed to rupture and exude the methyl methacrylate. A thin sample of these microcapsules on a microscopic slide was subjected to ultraviolet irradiation for 30 minutes and re-examined. No exudation took place under pressure indicating that the enclosed liquid monomer had been converted to the solid polymer by ultraviolet activated addition polymerization.

EXAMPLE 7

Microcapsules containing water in a polyamide shell were prepared as follows: 2 parts terephthaloyl chloride were dissolved in 100 parts mineral spirits. A second solution of 5 parts diethylenetriamine dissolved in 200 parts water was prepared. A glass tube was heated and drawn out to provide a fine orifice having an opening of approximately 0.1 millimeter in diameter. 5 parts of the aqueous triamine solution was extruded through the orifice under high pressure into the acid chloride solution. Small droplets were formed in the acid chloride solution which substantially instantaneously became encased in a polymer shell formed at the interface. The capsules were collected and examined and were found to contain water.

EXAMPLE 8

Glycerine was encapsulated in a polyamide shell as follows: 2 parts terephthaloyl chloride was dissolved in 100 parts mineral spirits. A second solution was prepared containing 5 parts diethylenetriamine and 200 parts glycerine. A glass tube was heated and drawn out to give a fine orifice having an opening of 0.1 millimeter in diameter. 5 parts of the triamine solution was extruded through the orifice under pressure into the acid chloride solution. Small droplets were dispersed in the acid chloride solution and substantially instantaneously became encased by the polymer formed at the interface. The capsules were collected and examined and were found to contain glycerine.

EXAMPLE 9

A polyglycol having an average molecular weight of 400 was encapsulated in a polyamide shell, employing the procedure described in Example 8. The capsules, when examined, were found to contain the polyglycol.

EXAMPLE 10

Concentric multi-wall capsules, each wall separated by a layer of liquid, were prepared as follows: A solution containing 2 parts terephthaloyl chloride in 100 parts mineral spirits was prepared. A second solution containing 5 parts diethylenetriamine in 200 parts water was made up. Relatively large drops (1–10 mm.) of the diacid chloride solution were introduced into the triamine solution and allowed to stand therein for 2 minutes during which time a polymer shell formed around each drop. These capsules were carefully removed, allowed to drain, then immersed in the diacid chloride solution. A second interfacial film of the same polymer formed around the original capsule but was separated from the original shell by a thin layer of aqueous triamine solution. these double walled capsules were carefully removed, drained and re-immersed in the aqueous triamine solution to form a third film of polymer separated from the second film by a thin layer of mineral spirits solvent. Alternate dipping was continued until six distinct concentric shells, each separated alternately by aqueous and mineral spirits solvent layers, were formed about the original drop.

EXAMPLE 11

A dispersion of previously formed microcapsules can be encapsulated as follows: 3.75 parts terephthaloyl chloride, 0.5 part azodiisobutyronitrile and 100 parts of methyl methacrylate were emulsified in 180 parts water containing 4.5 parts polyvinyl alcohol. The emulsion was then poured into a solution of 1.25 parts diethylenetriamine and 1.5 parts sodium hydroxide in 180 parts of water and the mixture allowed to stand for several minutes. Microcapsules containing liquid methyl methacrylate encased in a polyamide shell were obtained.

10 parts of the dispersed microcapsules containing monomer were injected under pressure into a solution of 5 parts terephthaloyl chloride in 200 parts toluene. The injected stream broke up into droplets of the triamine dispersion and a polymer film formed instantaneously at the interface of the droplets, thereby effectively encapsulating the dispersion of the previously formed microcapsules.

EXAMPLE 12

A volatile organic liquid is encapsulated in a polyamide shell and thereafter re-coated as follows: A solution of hexamethylenediamine was prepared by dissolving 9.28 parts hexamethylenediamine and 6.4 parts sodium hydroxide in 200 parts water. A 0.4 molar solution of sebacoyl chloride was made up by dissolving 1.47 parts sebacoyl chloride in carbon tetrachloride. Thereafter, 0.5 part polyvinyl alcohol was dissolved in 100 parts water and 50 parts of the solution were added to 10 parts of the 0.4 molar solution of sebacoyl chloride in carbon tetrachloride, prepared as above, providing a coarse suspension of carbon tetrachloride in water. To this suspension was added 10 parts of the aqueous diamine solution with gentle stirring. A dispersion of capsules was formed, each capsule having carbon tetrachloride encased in a polyamide shell. Excess diamine was removed by decantation and the capsules washed several times in tap water. 50 grams of a 2% aqueous polyvinyl alcohol solution was added to the capsules and the dispersion spray dried to give a secondary coating of polyvinyl alcohol about each capsule.

In the above examples in which the polycondensate is a polyamide, the amine can be replaced with other amines including 2,5-dimethyl piperazine, propylenediamine, triethylenetetraamine, tetramethylenediamine and piperazine. The terephthaloyl chloride can be replaced by other compounds including orthophthaloyl chloride.

In Example 4, the 2,2-bis(4-hydroxyphenyl)propane can be replaced by other hydroxy compounds including 4,4'-dihydroxybiphenyl, 1,2-bis(4-hydroxyphenyl)ethane; 2,2-bis(4-hydroxyphenyl)butane; 3,3-bis(4-hydroxyphenyl)pentane; 2,2-bis(4-hydroxyphenyl)pentane; 4,4'-dihydroxydiphenyl sulfone and 4,4'-dihydroxybenzophenone. The terephthaloyl chloride can be replaced by other diacid chlorides including isophthaloyl chloride, bis(4-chlorocarbonylphenyl)ether and phosgene.

In Examples 1–12, the polyamide and polyester condensates can be replaced by other condensates including polyurea condensates of phosgene and hexamethylenediamine, polyurethane condensates of tetramethylene bischloroformate and tetramethylenediamine; ethylene bischloroformate and piperazine and sulfonamides of 1,3-benzenedisulfonyl chloride and hexamethylene diamine. Thus, substantially any pair of reactants can be employed which will undergo interfacial polycondensation. Furthermore, the ratio of the reactants which take place in the interfacial polycondensation can vary over a relatively wide range. Thus, either reactant can be employed in a large excess. However, it is preferred that substantially stoichiometric amounts be selected. Additionally, the polycondensation reaction will occur over a broad temperature range. It has been found that the encapsulation process can be carried out advantageously at ambient temperatures, as well as temperatures approaching the boiling point of the continuous or dispersed phase. The proper selection of temperatures and proportions is within the ability of one skilled in the art having the instant specification, particularly the examples, as a guide. By judiciously selecting the particular reactants in relation to the substances to be encapsulated, the desirable characteristics of the polycondensate film can be advantageously employed. In many respects, insoluble, infusible condensation polymers are superior to addition-type polymers.

The capsules formed according to the instant invention can have diameters which vary quite widely depending to a substantial extent upon the nature of the dispersion. Thus, if the globules of the dispersion are extremely fine, the diameter of the capsules will be extremely small. However, if the dispersion is relatively coarse, the capsules will increase in diameter. Capsules having diameters of from about 0.1 micron to about 0.3 inch can be obtained. The thickness of a single encapsulating shell can vary from about 0.1 micron to about 450 microns. The total thickness of a multiwall capsule shell can be several times greater.

As noted hereinbefore, the internal phase of a single capsule or an intermediate layer between shells of a multiwall capsule may consist of solid, liquid or gas or any heterogeneous or homogeneous combination of the above. Furthermore, it may be desirable that the internal phase have a particular state during encapsulation, but is converted to a second state after completion of the encapsulation process, i.e., a liquid monomer converted to a polymer. The nature of a material during encapsulation may also be completely changed by suitable treatment after completion of encapsulation.

It should be appreciated that while there are above disclosed but a limited number of embodiments of this invention, it is possible to produce still other embodiments without departing from the inventive concept set forth.

It is claimed and desired to secure by Letters Patent:
1. The method of encapsulating a substance in a shell of solid synthetic condensation polymer formed by the polycondensation of two polyfunctional reactants adapted to condense to give said polymer, which method comprises the steps of: (1) dispersing one of said reactants and said substance to be encapsulated in the first fluid continuous phase, (2) dissolving said second reactant in a second fluid continuous phase which is a solvent for said second reactant and which is compatible with said first continuous phase, and (3) admixing said two continuous phases, whereby the reactants therein condense to form microcapsules of said substance in a shell of said polymer.

2. The process of claim 1, wherein the continuous phases of said step (1) and of said step (2) are each water.

3. The process of claim 1, wherein an emulsifying agent is employed in forming dispersion of said step (1).

4. The method of encapsulating a substance in a shell of solid synthetic condensation polymer formed by the polycondensation of two polyfunctional reactants adapted to condense to give said polymer, which method comprises the steps of: (1) forming a solution of one of said reactants and said substance, (2) dissolving the other of said reactants in a liquid solvent which is immiscible with said solution of step (1), and introducing said solution from step (1) as droplets into the solution of step (2), whereby the reactants therein condense to form microcapsules of said substance in a shell of said polymer.

5. The process of claim 4, wherein solution (1) is passed into solution (2) by passing said substance through an orifice under pressure.

6. The process of claim 4 wherein the solution of step (1) is formed by dissolving said first reactant in a liquid substance which is a solvent for said first reactant.

7. The process of claim 6 wherein the solution of step (1) is formed by dissolving said first reactant and said substance in a liquid which is a solvent for both said first reactant and said substance.

References Cited
UNITED STATES PATENTS

| | | | |
|---|---|---|---|
| 3,078,242 | 2/1963 | Morgan | 18—54 X |
| 3,208,951 | 9/1965 | Berger et al. | 252—316 |

RICHARD D. LOVERING, *Primary Examiner.*

U.S. Cl X.R.

44—7; 106—19; 117—100; 167—83; 252—188.3; 260—29.1, 89.5; 264—4